(12) United States Patent
Liu

(10) Patent No.: US 7,760,313 B2
(45) Date of Patent: Jul. 20, 2010

(54) SYSTEM FOR DISPLAYING IMAGES INCLUDING WIRING STRUCTURE FOR DRIVING DISPLAY PANEL

(75) Inventor: Chun-Yen Liu, Hsinchu County (TW)

(73) Assignee: TPO Displays Corp., Miao-Li County (TW)

( * ) Notice: Subject to any disclaimer, the term of this patent is extended or adjusted under 35 U.S.C. 154(b) by 961 days.

(21) Appl. No.: 11/537,776

(22) Filed: Oct. 2, 2006

(65) Prior Publication Data
US 2008/0079887 A1 Apr. 3, 2008

(51) Int. Cl.
*G02F 1/1345* (2006.01)
(52) U.S. Cl. ...................................... 349/149
(58) Field of Classification Search ............ None
See application file for complete search history.

(56) References Cited

U.S. PATENT DOCUMENTS 5,572,346 A * 11/1996 Sakamoto et al. ............ 349/150
6,054,975 A * 4/2000 Kurokawa et al. ........... 345/100
7,656,491 B2 * 2/2010 Yamazaki et al. ........... 349/141

* cited by examiner

*Primary Examiner*—Sung H Pak
(74) *Attorney, Agent, or Firm*—Thomas, Kayden, Horstemeyer & Risley

(57) ABSTRACT

Systems for displaying images and fabrication method thereof are provided. A representative system incorporates a wiring structure, for driving a display panel, which includes a substrate, a first conductive layer, a dielectric layer, and a second conductive layer. The first conductive layer, comprising an interconnection line, overlies the substrate. The interconnection line comprises a first terminal and a second terminal apart from the first terminal. The dielectric layer overlies the first conductive layer. The dielectric layer comprises a first opening exposing the first terminal, and a second opening exposing the second terminal. The second conductive layer, comprising a bonding pad, a guard ring surrounding the bonding pad, and a trace line outside the guard, overlies the dielectric layer. The bonding pad electrically connects the interconnection line through the first opening. The trace line electrically connects the interconnection line through the second opening.

19 Claims, 16 Drawing Sheets

SYSTEM FOR DISPLAYING IMAGES INCLUDING WIRING STRUCTURE FOR DRIVING DISPLAY PANEL

BACKGROUND OF THE INVENTION

1. Field of the Invention

The invention relates to display technology and in particular to wiring structure for driving a display panel.

2. Description of the Related Art

An exposed bonding pad is typically disposed overlying a substrate of a display panel for electrical connection to an active device or a printed circuit board comprising the active device to drive the display panel. In a subsequent process, a resist layer is formed directly on the bonding pad. Electrostatic discharge (ESD) frequently occurs during the photoresist coating process, so that electrostatic current flows into the display panel through the bonding pad, damaging the interior devices such as thin film transistor (TFT) devices. Further, when a conductive layer comprising the bonding pad is formed, a deposition process utilizing plasma enhanced chemical vapor deposition (PECVD) is typically performed to form an overlying layer. When the plasma particles contact and then charge the bonding pad, a current flows into the display panel through the bonding pad, also damaging the interior devices. The damaged devices may negatively affect the performance of the display panel, downgrading or scrapping the display panel.

BRIEF SUMMARY OF THE INVENTION

Systems for displaying images are provided.

The invention provides a system comprising a wiring structure for driving a display panel, comprising a substrate, a first conductive layer, a dielectric layer, and a second conductive layer. The first conductive layer, comprising an interconnection line, overlies the substrate. The interconnection line comprises a first terminal and a second terminal apart from the first terminal. The dielectric layer overlies the first conductive layer. The dielectric layer comprises a first opening exposing the first terminal, and a second opening exposing the second terminal. The second conductive layer, comprising a bonding pad, a guard ring surrounding the bonding pad, and a trace line outside the guard, overlies the dielectric layer. The bonding pad electrically connects the interconnection line through the first opening. The trace line electrically connects the interconnection line through the second opening.

The invention further provides a system comprising a wiring structure for driving a display panel, comprising a substrate, a first conductive layer, a dielectric layer, a second conductive layer, and an third conductive layer. The first conductive layer, comprising an interconnection line, overlies the substrate. The interconnection line comprises a first terminal and a second terminal apart from the first terminal. The dielectric layer overlies the first conductive layer. The dielectric layer comprises a first opening exposing the first terminal, and a second opening exposing the second terminal. The second conductive layer, comprising a bonding pad, a guard ring surrounding the bonding pad, and a trace line outside the guard, overlies the dielectric layer. The third conductive layer is disposed below the guard ring, electrically connecting thereto. The bonding pad electrically connects the interconnection line through the first opening. The trace line electrically connects the interconnection line through the second opening.

Further scope of the applicability of the invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
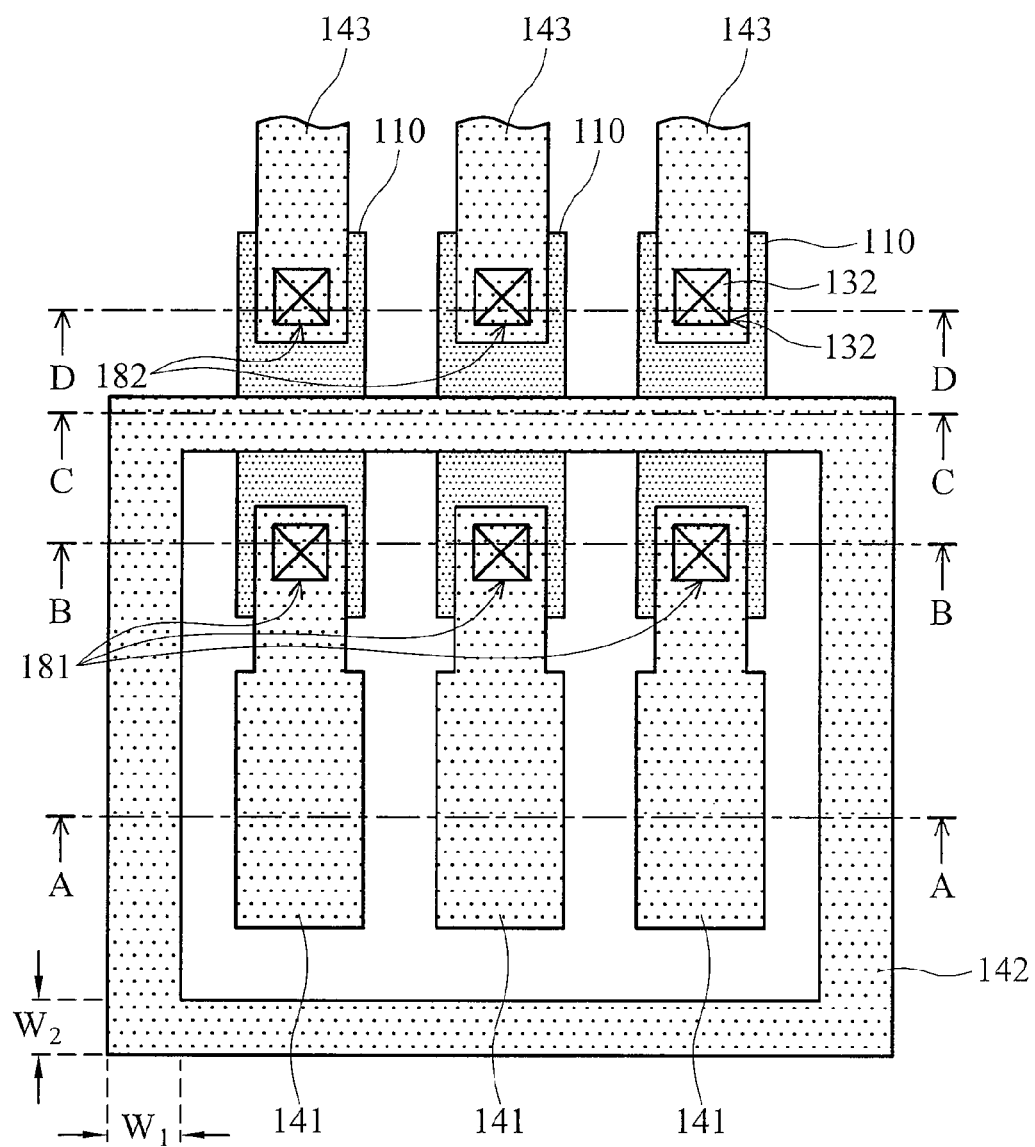
FIG. 1 is an exemplary top view of wiring structures of preferred embodiments of the invention.

FIG. 1 is an exemplary top view of wiring structures 10 and 20 of preferred embodiments of the invention, the wiring structures 10 and 20 having substantially the same top view.

Figure 2A:
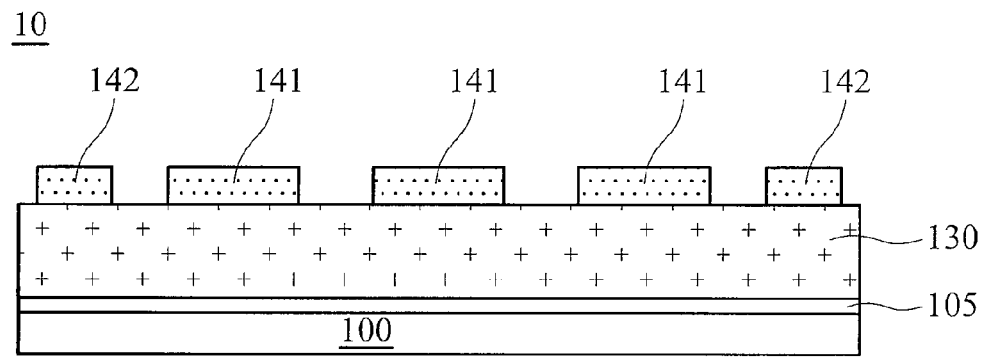
FIGS. 2A through 2C are cross-sections of a wiring structure of a preferred embodiment of the invention.
Figure 2B:
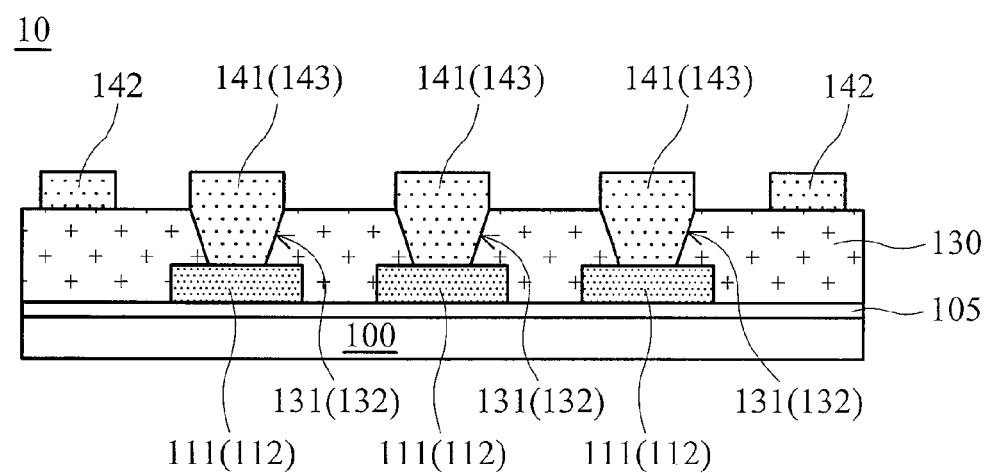
Figure 2C:
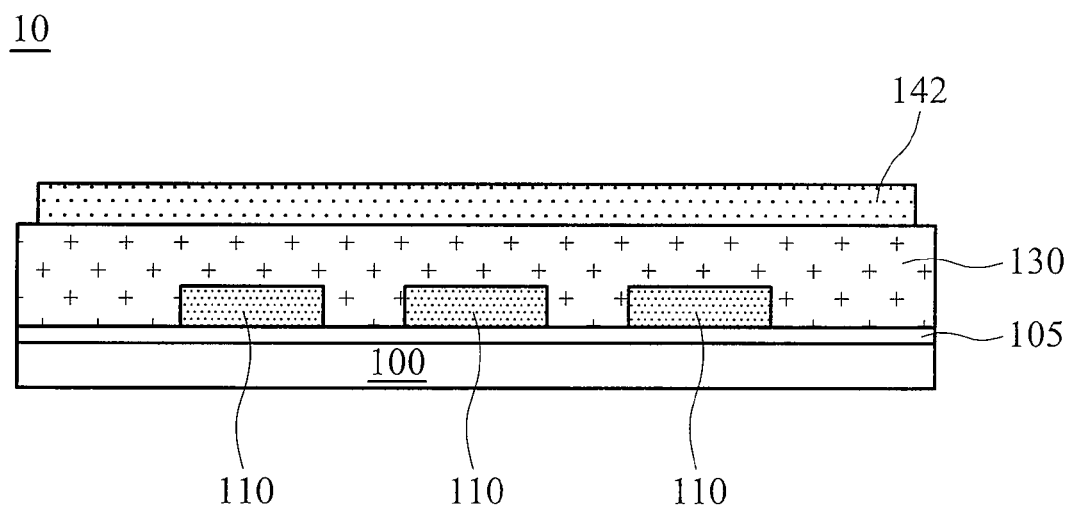

In FIGS. 1 and 2A through 2C, wiring structure 10 is shown. FIG. 2A is a cross-section along line AA in FIG. 1. FIG. 2B is a cross-section along line BB in FIG. 1. FIG. 2C is a cross-section along line CC in FIG. 1. The cross-section along line DD in FIG. 1 is similar to that shown in FIG. 2B, in addition to lacking only element "142". Thus, the cross-section along line DD in FIG. 1 is combined into FIG. 2B. The wiring structure 10 comprises a substrate 100, a first conductive layer comprising an interconnection line 110, a dielectric layer 130, and a second conductive layer comprising a bonding pad 141, a guard ring 142 surrounding the bonding pad 141, and a trace line 143 outside the guard 142. Only the first and second conductive layers are shown in FIG. 1 for clearer identification of a characteristic of the invention.

The substrate 100 can be transparent, opaque, or half-tone as desired. In some embodiments, the substrate 100 is rigid such as glass, ceramic, metal, or semiconductor. In other embodiments, the substrate 100 is flexible, such as polymer. In this embodiment, the substrate 100 is transparent, such as glass, for displaying images, and comprises a gate insulator layer 105 overlying a surface. The substrate 100 typically comprises overlying devices such as thin film transistors (TFTs), other wirings, or a combination thereof, but these devices are not shown for clarity.

The first conductive layer, comprising an interconnection line 110, overlies the gate insulator layer 105 overlying the substrate 100. The interconnection line 110 comprises a first terminal 111 (crossed by line BB) and a second terminal 112 (crossed by line DD) apart from the first terminal 111 as shown in FIGS. 1 and 2B, for electrical connection between the bonding pad 141 and trace line 143 as subsequently described. The first conductive layer preferably comprises Al, Mo, Al—Nd, W, or other conductive materials. When the substrate 100 comprises overlying TFTs, for example, the interconnection line 110 and the gate electrodes (not shown) of the TFTs may be in the same conductive layer or not as desired. In this embodiment, the interconnection line 110 and the gate electrodes are in the same first conductive layer. Thus, the interconnection line 110 and the gate electrodes can be simultaneously patterned from the first conductive layer in a photolithography process utilizing the same photomask, reducing process cost and compatible with fabrication of the TFTs or other devices.

The dielectric layer 130 overlies the first conductive layer. The dielectric layer 130 comprises a first opening 131 (crossed by line BB) exposing the first terminal 111, and a second opening 132 (crossed by line DD) exposing the second terminal 112. The dielectric layer 130 preferably comprises silicon oxide, silicon nitride, silicon oxide/silicon nitride dual-layer, oe other dielectric materials. When the substrate 100 comprises the overlying devices, the dielectric layer 130 may further overlie the devices, and comprise other openings exposing contacts of the devices as desired.

The second conductive layer, comprising the bonding pad 141, the guard ring 142, and the trace line 143, overlies the dielectric layer 130. The trace line 143 further extends to electrically connect other driving circuit, such as scan driver or data driver, overlying the substrate 100. In some embodiments, a third conductive layer (not shown) fills the openings 131 and 132. Thus, the bonding pad 141, the interconnection line 110, and the trace line 143 are electrically connected. In this embodiment, the second conductive layer fills the openings 131 and 132. The bonding pad 141 electrically connects the interconnection line 110 through the opening 131, and the trace line 143 electrically connects the interconnection line 110 through the opening 132. Thus, the bonding pad 141 and the trace line 143 are electrically connected.

When the substrate 100 comprises overlying TFTs, for example, the bonding pad 141, the guard ring 142, the trace line 143 and the TFT contacts (not shown), such as landing pads of drain regions, may be in the same conductive layer or not as desired. In this embodiment, the bonding pad 141, the guard ring 142, the trace line 143, and the TFT contacts are in the same second conductive layer of the invention. The bonding pad 141, the guard ring 142, the trace line 143, and the TFT contacts can be simultaneously patterned from the second conductive layer in a photolithography process utilizing the same photomask. Thus, process cost can be reduced and the described process can be compatible with fabrication of the TFTs or other devices.

As shown in FIG. 2C, the dielectric layer 130 isolates the guard ring 142 and the interconnection line 110, preventing the trace line 143 shorting to the guard ring 142.

In FIG. 1, the bonding pad 141 is surrounded by the guard ring 142. Thus, the underlying conductive layer, the first conductive layer, is patterned to form the interconnection line 110 to assist electrical connection between the bonding pad 141 and the trace line 143. The dielectric layer 130 (shown in FIGS. 2A through 2C) isolates the interconnection line 110 and the guard ring 142. The bonding pad 141 electrically connects the interconnection line 110 through the contact window 181, where the opening 131 of the dielectric layer 130 is formed. The trace line 143 electrically connects the interconnection line 110 through the contact window 182, where the opening 132 of the dielectric layer 130 is formed. Thus, the interconnection line 110 electrically connects the bonding pad 141 and the trace line 143.

The guard ring 142 shields and shares the electrostatic charges generated in the subsequent process such as the planarization, color filter coating, or other processes, or plasma damages from the subsequent PECVD process. The guard ring 142 protects the driving circuit electrically connecting the traces, such as scan/data driver, from damage by ESD and/or plasma discharge. Thus, process yield, product cost, and device reliability are improved. The guard ring 142 is preferably arranged as a close loop to enhance the charge shielding performance thereof. Further, the resistance of the guard ring 142 affects the charge shielding performance thereof. When the resistance of the guard ring 142 exceeds 10 KΩ, the charge shielding performance thereof may deteriorate. Thus, the resistance of the guard ring is preferably less than 10 KΩ to enhance the charge shielding performance thereof. In some cases, the width of the guard ring 142 may affect the charge shielding performance thereof. In one embodiment, the at least one of the widths $W_1$ and $W_2$ of the guard ring 142 as shown in FIG. 1 preferably exceeds 50 μm to enhance the charge shielding performance thereof, and more preferably both widths $W_1$ and $W_2$ exceed 50 μm to further enhance the charge shielding performance thereof.

The wiring structure 10 can be applied in display panels such as liquid crystal display (LCD) panels, light-emitting device (LED) display panels, and other display panels.

Figure 3:
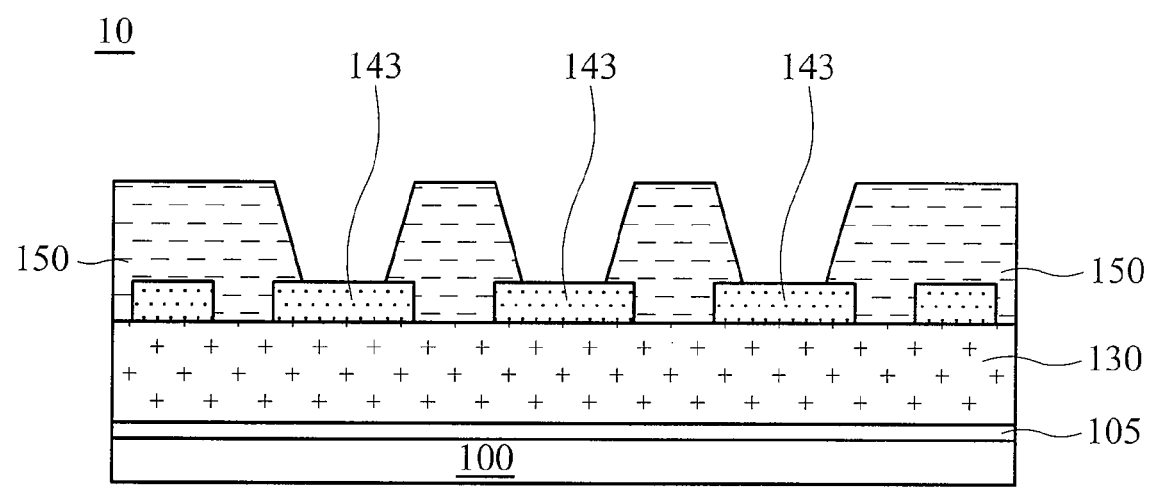
FIG. 3 is a cross-section of an application of the wiring structure of the invention.

FIG. 3 is a cross-section of the wiring structure 10 applied in LCD panels. Specifically, FIG. 3 is compatible with the cross-section along line AA in FIG. 1. In FIG. 3, a planarization layer 150, such as organic resin film or SOG film, is formed overlying the dielectric layer 130 and the second conductive layer. The planarization layer 150 is then patterned to expose at least parts of the bonding pad 141. In one embodiment, an IC chip (not shown) can be attached to the exposed bonding pad 141, and drive the LCD panel through the bonding pad 141 and the trace line 143 shown in FIG. 1. In an alternative embodiment, the bonding pad electrically connects to a printed circuit board (not shown), such as a flexible printed circuit board (FPCB) with an IC chip (not shown) thereon. The IC chip on the FPCB can drive the LCD panel through the bonding pad 141 and the trace line 143 shown in FIG. 1.

Figure 4A:
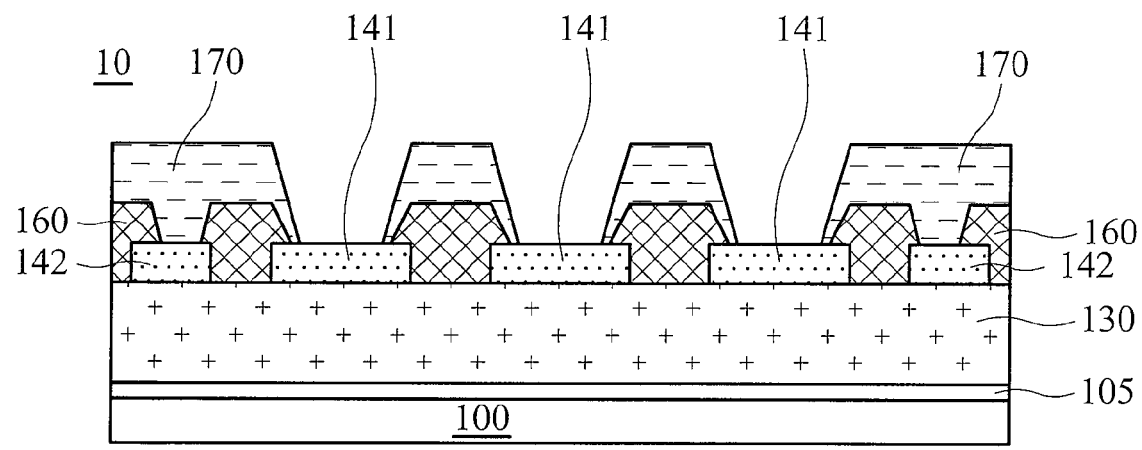
FIGS. 4A and 4B are cross-sections of another application of the wiring structure of the invention.
Figure 4B:
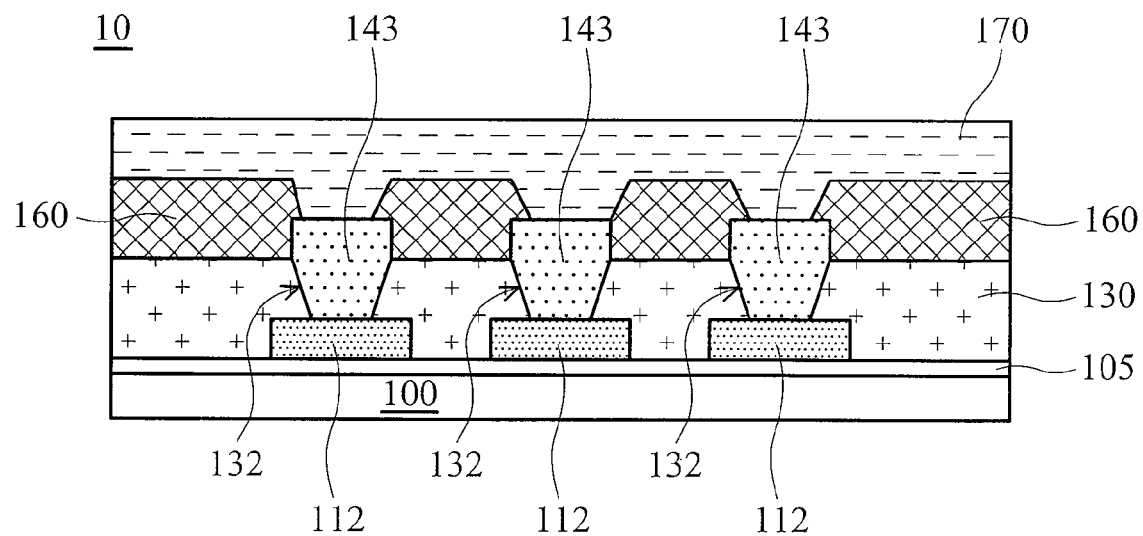

FIGS. 4A and 4B are cross-sections of the wiring structure 10 applied in LED display panels. Specifically, FIG. 4A is compatible with the cross-section along line AA in FIG. 1, and FIG. 4B is compatible with the cross-section along line DD in FIG. 1. In FIGS. 4A and 4B, a passivation layer 160, such as silicon oxide, silicon nitride, silicon oxide/silicon nitride dual-layer, or other dielectric materials, is formed overlying the dielectric layer 130 and the second conductive layer. The passivation layer 160 is then patterned to expose at least parts of the bonding pad 141, the guard ring 142, and the trace line 143. Next, a planarization layer 170, such as organic resin film or SOG film, is formed overlying the passivation layer 160 and the second conductive layer. The planarization layer 170 is then patterned to expose at least parts of the bonding pad 141. As described, the exposed bonding pad 141 can electrically connect an IC chip, or an FPCB with the IC chip, driving the LED display panel through the bonding pad 141 and the trace line 143 shown in FIG. 1.

Figure 5A:
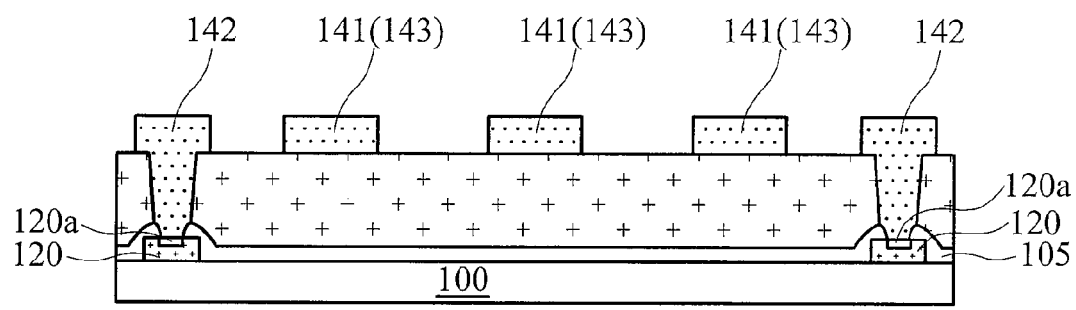
FIGS. 5A through 5C are cross-sections of a wiring structure of another preferred embodiment of the invention.
Figure 5B:
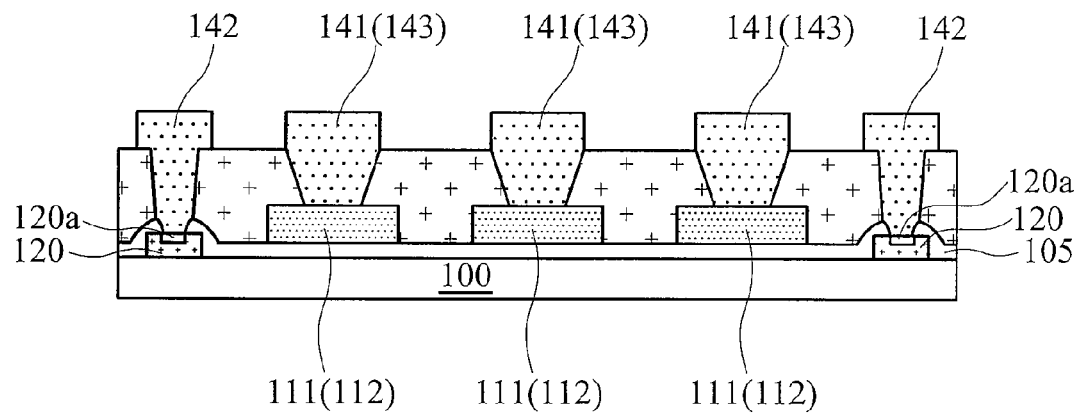
Figure 5C:
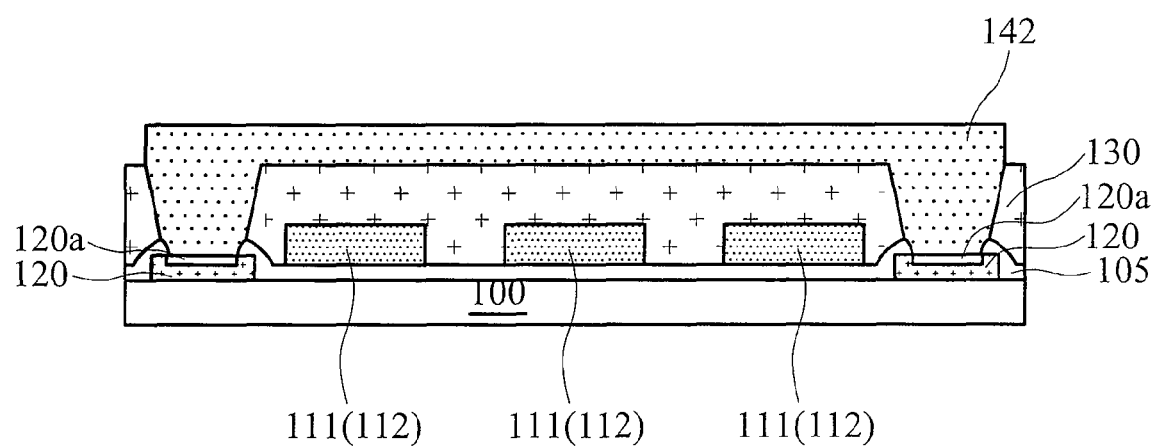

In FIGS. 1 and 5A through 5C, the wiring structure 20 of another embodiment of the invention is shown. FIG. 5A is a cross-section along line AA in FIG. 1. FIG. 5B is a cross-section along line BB in FIG. 1. FIG. 5C is a cross-section along line CC in FIG. 1. The cross-section along line DD in FIG. 1 is similar to that shown in FIG. 5B, in addition to lacking only elements "142" and "120". Thus, the cross-section along line DD in FIG. 1 is combined to FIG. 5B. The wiring structure 20 comprises a substrate 100, a first conductive layer comprising an interconnection line 110, a dielectric layer 130, and a second conductive layer comprising a bonding pad 141, a guard ring 142 surrounding the bonding pad 141, and a trace line 143 outside the guard 142. Details thereof are the same as those described for the wiring structure 10, and thus, are omitted herefrom.

Compared to the wiring structure 10, the wiring structure 20 further comprises an third conductive layer 120 rather than the wiring structure 10 as shown in FIGS. 5A through 5C. The third conductive layer 120 comprises an ohmic contact interface 120a on a surface. The third conductive layer 120 is disposed below the guard ring 142. In this embodiment, the third conductive layer 120 extends along the guard ring 142, but ends near the interconnection line 110, disposed beyond the interconnection line 110. The third conductive layer 120 is preferably embedded in the dielectric layer 130, and the dielectric layer 130 isolates the third conductive layer 120 and the interconnection line 110. The third conductive layer 120 may comprise conductive materials, such as metal, doped polycrystalline semiconductor layer, conductive polymer, conductive ceramic, conductive metal compound, or other known conductive materials. In this embodiment, the third conductive layer 120 comprises polycrystalline silicon, which is N-type doped or P-type doped in the ohmic contact interface 120a. Thus, formation of the third conductive layer 120 can be compatible with the overlying devices of the substrate 100, such as TFTs.

When the substrate 100 comprises overlying TFTs, for example, the third conductive layer 120 and an active layer (not shown) for formation of source, channel, and drain regions of the TFTs may be in the same semiconductor (silicon) layer or not as desired. In this embodiment, the third conductive layer 120 and the active layer are in the same polycrystalline silicon layer. Thus, the third conductive layer 120 and the active layers can be simultaneously patterned from the silicon layer in a photolithography process utilizing the same photomask, reducing process cost and compatible with fabrication of the TFTs or other devices.

Similar to the wiring structure 10, the wiring structure 20 can be applied in display panels such as LCD panels, LED display panels, and other display panels, as that shown in FIGS. 3, 4A, and 4B, and thus, details thereof are omitted herefrom.

Figure 6A:
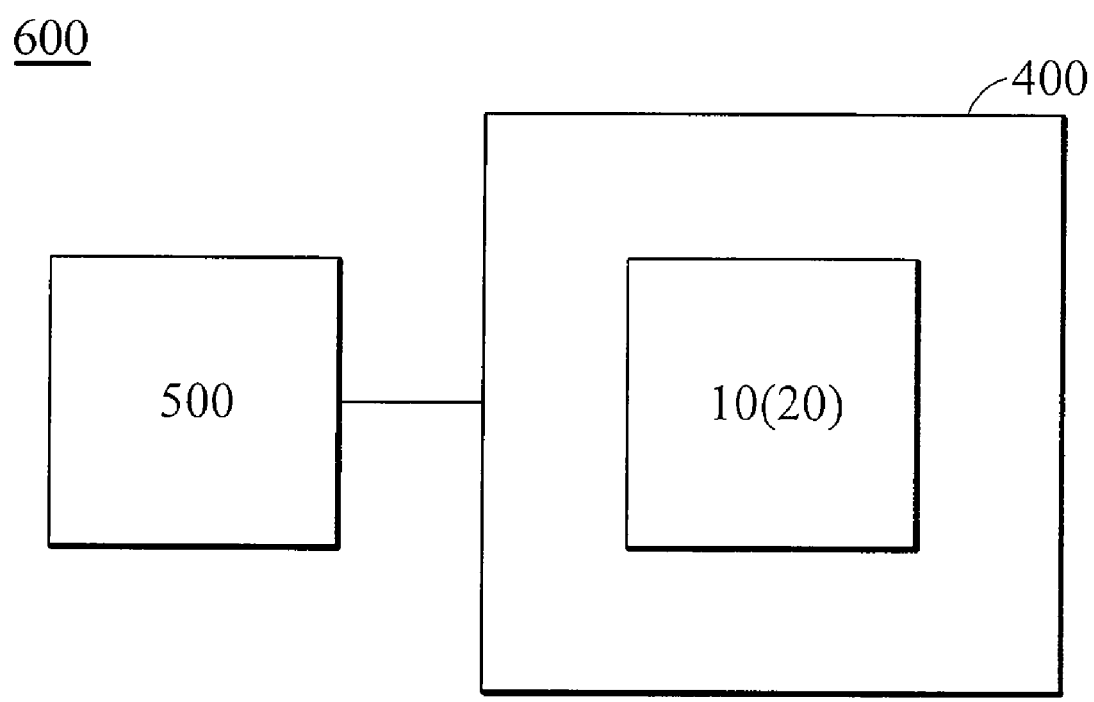
FIGS. 6A and 6B schematically show another embodiment of a system for displaying images.
Figure 6B:
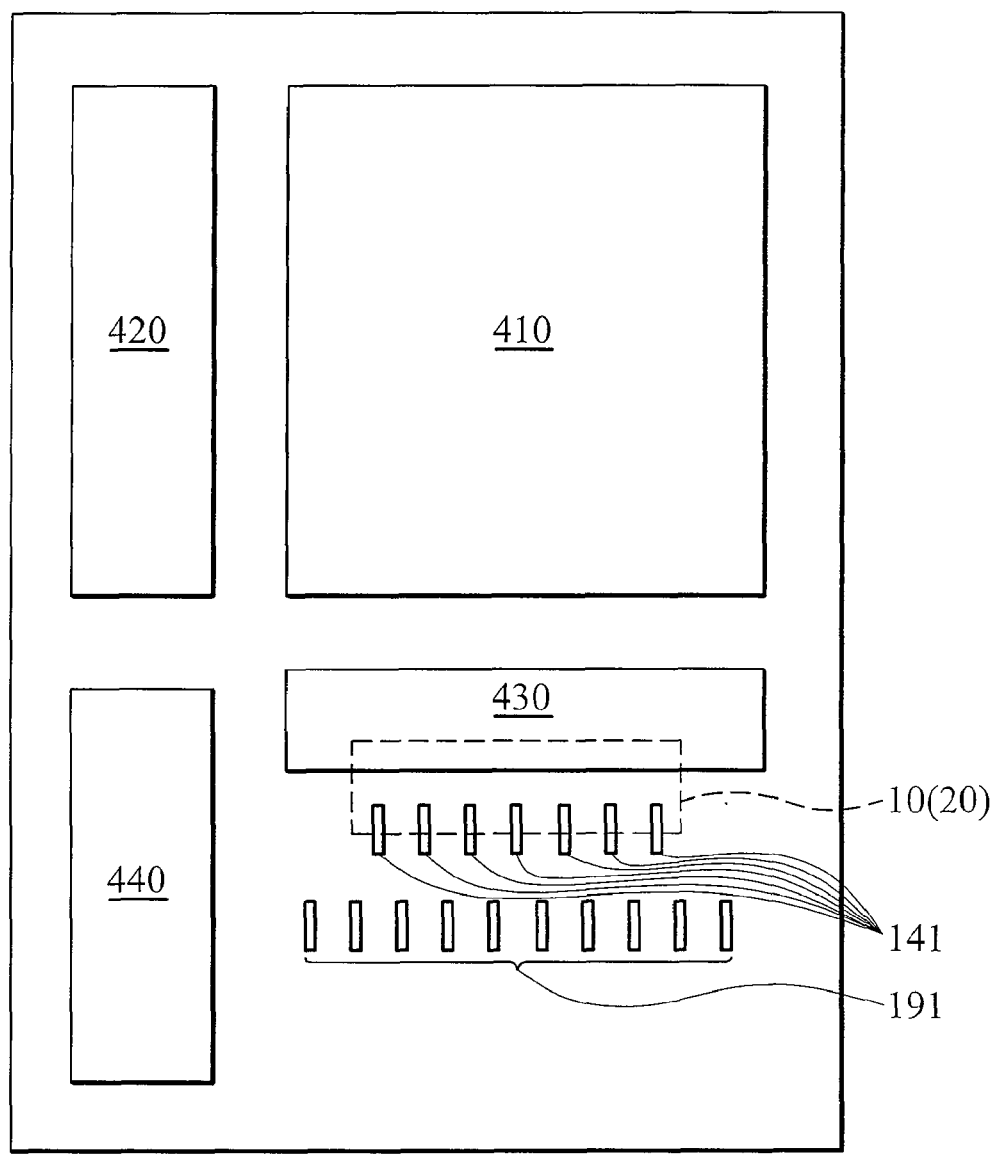

FIGS. 6A and 6B schematically show another embodiment of a system for displaying images which, in this case, is implemented as a display panel 400 or an electronic device 600. The disclosed wiring structures can be incorporated into a display panel such as an LCD panel, an LED display panel, or other display panels. As shown in FIG. 6A, the display panel 400 comprises a wiring structure, such as the wiring structure 10 shown in FIGS. 2A through 2C and the wiring structure 20 shown in FIGS. 5A through 5C. The display panel 400 can form a portion of a variety of electronic devices (in this case, electronic device 600). Generally, the electronic device 600 can comprise the display panel 400 and an input unit 500. Further, the input unit 500 is operatively coupled to the display panel 400 and provides input signals (e.g., an image signals) to the display panel 400 to generate images. The electronic device 600 can be a mobile phone, digital camera, PDA (personal data assistant), notebook computer, desktop computer, television, car display, or portable DVD player, for example.

In FIG. 6B, an exemplary layout of the display panel 400 is shown. In this embodiment, the display panel 400 comprises an active area 410, a scan driver area 420, a data driver area 430, an optional circuit area 440, the bonding pads 141, and optional bonding pads 191. The active area 410 comprises a plurality of TFTs acting as switches. The scan driver area 420 and the data driver area 430 are disposed beside the active area 410. The scan driver area 420 applies voltage to pixel electrodes in the active area 410. The data driver area 430 applies voltage to gate electrodes of the TFTs in the active area 410. The inventive wiring structure 10 or 20 electrically connects to the data driver area 430. When the bonding pads 141 are utilized for contact to IC chips (not shown), the optional bonding pads 191 are required for contact to a flexible printed circuit board (not shown).

Figure 7:
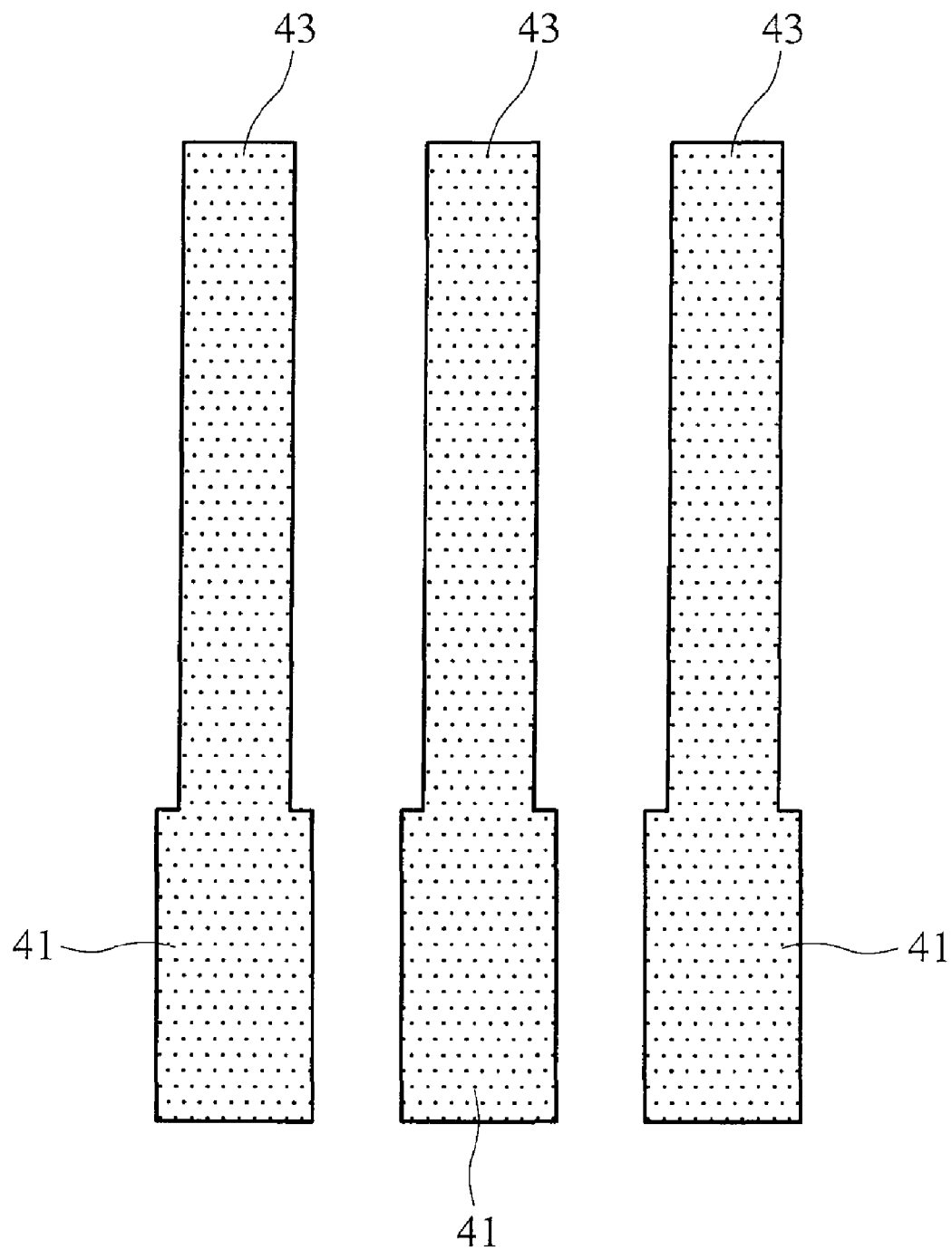
FIG. 7 is an exemplary top view of a conventional wiring structure.

A control example is shown in FIG. 7, and the wiring structure 10 is utilized as an experimental example, verifying the improved performance of the embodiment.

In FIG. 7, a top view of a conventional wiring structure 30 utilized as the control example is shown. The wiring structure 30 comprises a bonding pad 41 electrically connecting a trace line 43, and has no guard rings. The electrical connection between the bonding pad 41 and the trace line 43 occurs in the same conductive layer. The trace line 43 further extends to electrically connect other driving circuit of its substrate, such as TFTs.

The planarization layer 150 shown in FIG. 3, or the passivation layer 160 and the planarization layer 170 shown in FIG. 4. LCD panel are formed overlying the wiring structures 10 and 30, completing an experimental substrate with a plurality of the inventive display panels 400 comprising the inventive wiring structure 10, and a control substrate with a plurality of conventional display panels, comprising the conventional wiring structure 30. Each display panel is sampled to test threshold voltages of the TFTs, and the results are shown in Table 1.

TABLE 1

| Position | Experimental Example Threshold Voltage (V) | Control Example Threshold Voltage (V) |
|---|---|---|
| 1 | 0.97 | 0.91 |
| 2 | 0.77 | 1.10 |
| 3 | 0.73 | 1.24 |
| 4 | 0.81 | 1.62 |
| 5 | 0.94 | 1.80 |
| 6 | 0.75 | 1.09 |
| 7 | 0.77 | 1.29 |
| 8 | 0.54 | 0.96 |
| 9 | 0.66 | 0.87 |
| Average | 0.77 | 1.21 |
| Standard deviation | 0.13 | 0.32 |

In the control example, the conventional wiring structure undergoing ESD and/or plasma discharge, conducted the discharged current to the TFTs, damaging the TFTs, and thus, threshold voltage values thereof and the standard deviation of the threshold voltage value are apparently increased. It is appreciated that the inventive wiring structure 10 comprises the guard ring 142 effectively protecting the TFTs electrically connecting thereto from the described discharge damage, and the threshold voltage values and the standard deviation thereof from the inventive display panel 400 are much lower than those from the conventional display channel.

Figure 8A:
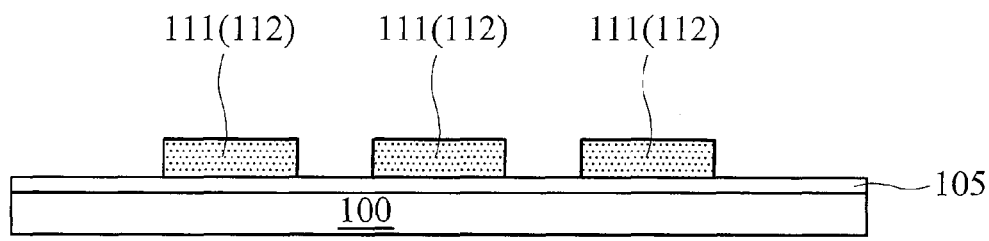
FIGS. 8A and 8B are cross-sections of an exemplary fabrication method of the wiring structure of the invention.
Figure 8B:
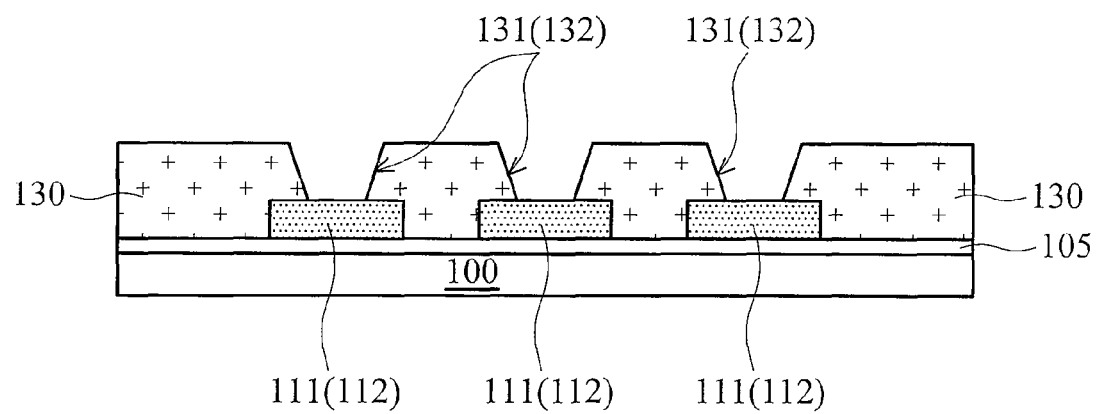
Figure 9A:
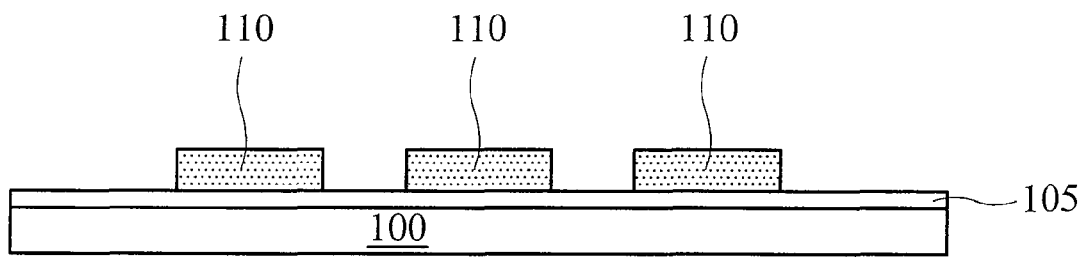
FIGS. 9A and 9B are cross-sections of an exemplary fabrication method of the wiring structure of the invention.
Figure 9B:
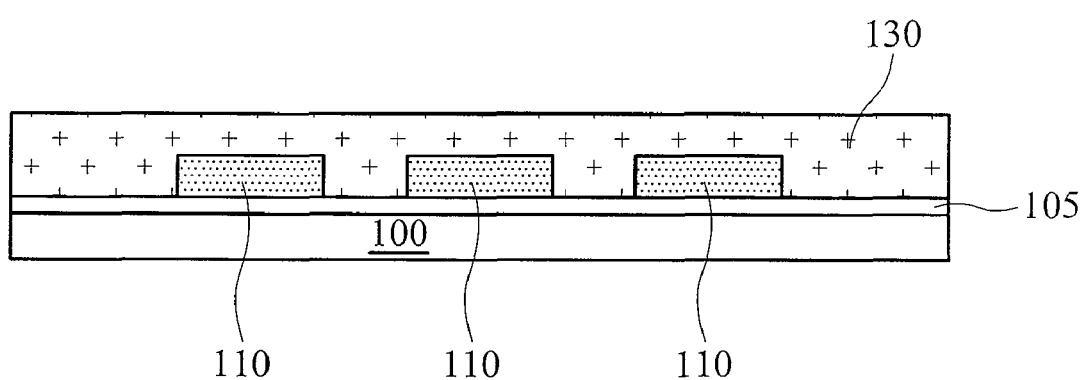

FIGS. 8A, 8B, 9A, and 9B are cross-sections of an exemplary fabrication method of the wiring structure 10 of the invention. FIGS. 8A and 8B are compatible with the cross-sections along lines BB and DD in FIG. 1, and FIGS. 9A and 9B are compatible with the cross-sections along line CC in FIG. 1.

In FIGS. 8A and 9A, a substrate 100 is provided. As described, the substrate 100 is a glass substrate in this embodiment, and may comprise overlying devices such as TFTs. In this embodiment, the substrate 100 comprises an overlying gate insulator layer 105. A first conductive layer is then formed overlying the substrate 100 by a method such as sputtering, evaporation, chemical vapor deposition, or other known deposition methods, followed by patterning to form the interconnection line 110 comprising the first terminal 111 and the second terminal 112 apart from the first terminal 111 as shown in FIG. 1. As described, conductive parts of the overlying devices of the substrate 100, such as the gate electrodes of the TFTs, can be simultaneously patterned from the first conductive layer by utilization of the same photomask.

In FIGS. 8B and 9B, a dielectric layer 130 is formed overlying the first conductive layer by a method such as chemical vapor deposition, spin coating, or other known film formation methods. The dielectric layer 130 is then patterned to form a first opening 131 and a second opening 132, respectively exposing the first terminal 111 and second terminal 112 for formation of the contact windows 181 and 182 shown in FIG. 1. Further, the contact windows of the overlying devices of the substrate 100, such as the drain regions of the TFTs, are preferably simultaneously exposed by the same patterning step utilizing the same photomask, reducing the processing period and cost.

A second conductive layer is then formed overlying the dielectric layer 130 by a method such as sputtering, evaporation chemical vapor deposition, or other known deposition methods, followed by patterning to form the bonding pad 141, the guard ring 142, and the trace line 143. The bonding pad 141 electrically connects the interconnection line 110 through the first opening 131. The guard ring 142 surrounds the bonding pad 141. The trace line 143, disposed outside the guard ring 142, electrically connects the interconnection line 110 through the opening 132. Thus, the inventive wiring structure 10 as shown in FIGS. 1 and 2A through 2C is complete. In some embodiments, another conductive material can be filled in the first opening 131 and the second opening 132 prior to formation of the second conductive layer for electrical connection between the interconnection line 110, the bonding pad 141, and the trace line 143. In this embodiment, the second conductive layer fills the first opening 131 and the second opening 132 to simplify the process steps and reduce resistance between the interconnection line 110 and the bonding pad 141/trace line 143. The contacts to the overlying devices of the substrate 100, such as the drain contacts of the TFTs, are preferably simultaneously formed and patterned from the same second conductive layer by utilization of the same photomask reducing the processing period and cost. Thus, formation of the inventive wiring structure 10 can be compatible with formation of the overlying devices of the substrate 100.

Figure 10A:
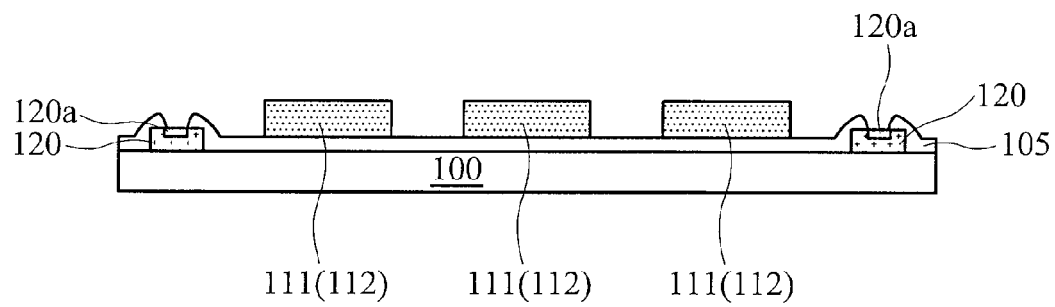
FIGS. 10A through 10C are cross-sections of another exemplary fabrication method of the wiring structure of the invention.
Figure 10B:
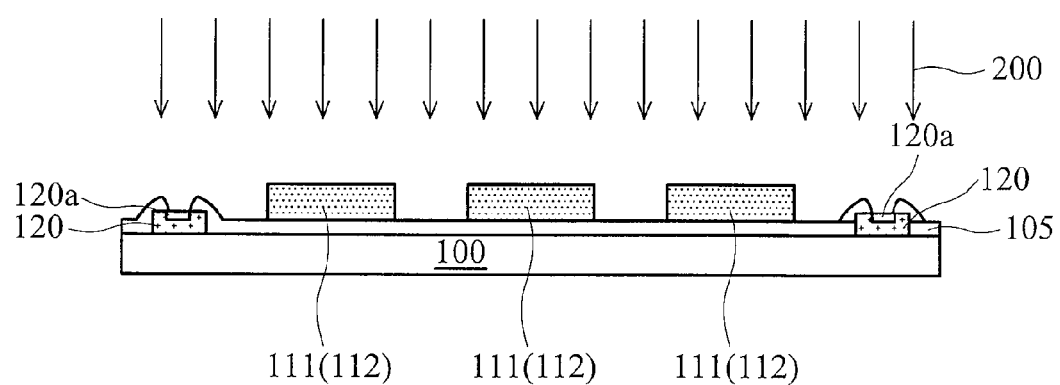
Figure 10C:
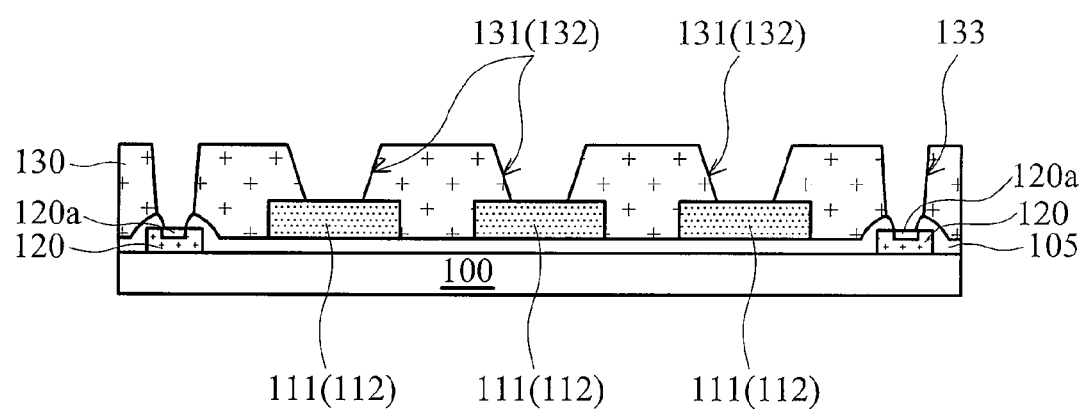
Figure 11A:
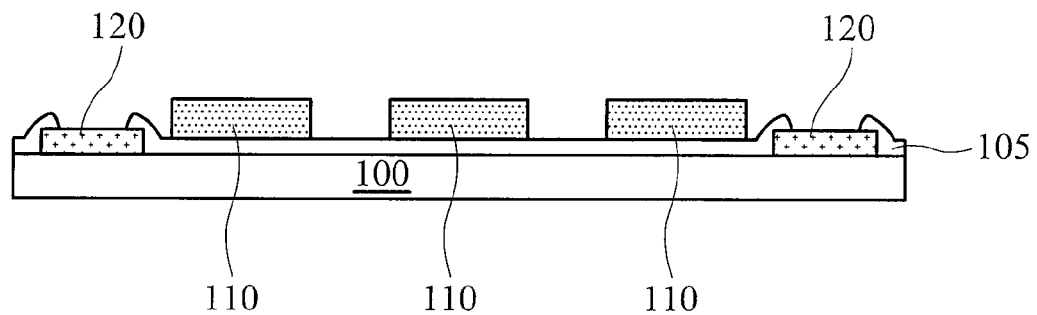
FIGS. 11A through 11C are cross-sections of another exemplary fabrication method of the wiring structure of the invention.
Figure 11B:
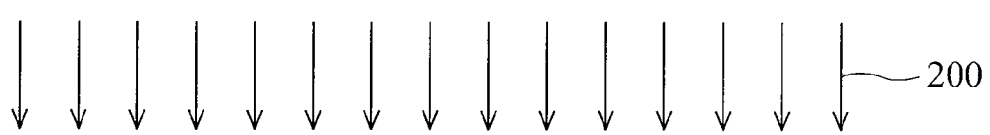
Figure 11B:
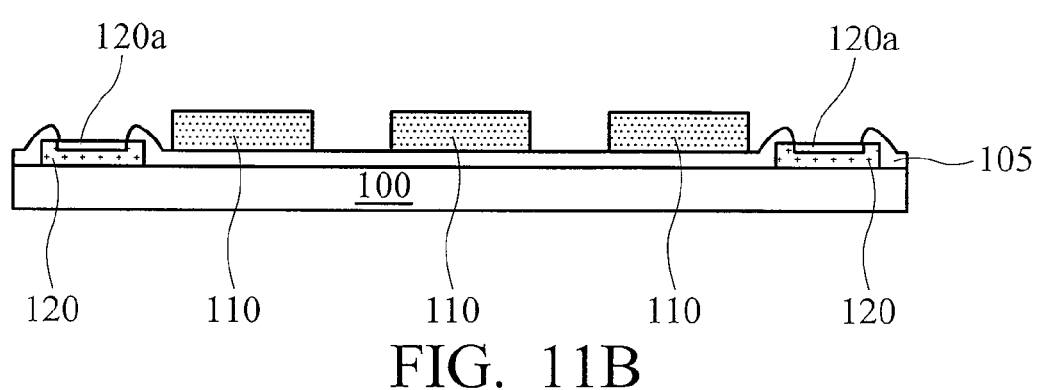

FIGS. 10A through 10C and 11A through 11C are cross-sections of an exemplary fabrication method of the wiring structure 20 of the invention. FIGS. 10A and 10B are compatible with the cross-sections along lines BB and DD in FIG. 1, and FIGS. 11A and 11B are compatible with the cross-sections along line CC in FIG. 1.

In FIGS. 10A and 11A, a substrate 100 is provided. As described, the substrate 100 is a glass substrate in this embodiment. As described, the substrate 100 may comprise overlying devices such as TFTs. An third conductive layer 120 is also formed overlying the substrate 100 by a method such as sputtering, evaporation, chemical vapor deposition, or other known deposition methods, and patterned to extend the profile of the subsequently formed guard ring 142, but be disposed beyond the interconnection line 110, preventing contacting, bridging, or electrically connecting therewith. The third conductive layer 120 preferably comprises a semiconductor layer, such as polycrystalline silicon, and thus, the semiconductor layer for formation of the source, channel, drain regions of the TFTs and the third conductive layer 120 can be simultaneously formed and patterned from the same semiconductor layer by utilization of the same photomask to reduce the processing step and cost.

A gate insulator layer 105 is then formed overlying the substrate 100 and the third conductive layer 120, followed by patterning to expose the third conductive layer 120. A first conductive layer is formed overlying the substrate 100 and then patterned as described for FIGS. 8A and 9A.

When the third conductive layer 120 comprises a semiconductor layer, the exposed third conductive layer 120 is doped with ions 200 as shown in FIGS. 10B and 11B, forming the ohmic contact interface 120a on the exposed surface of the third conductive layer 120. The ions 200 can be N-type or P-type as desired.

Figure 11C:
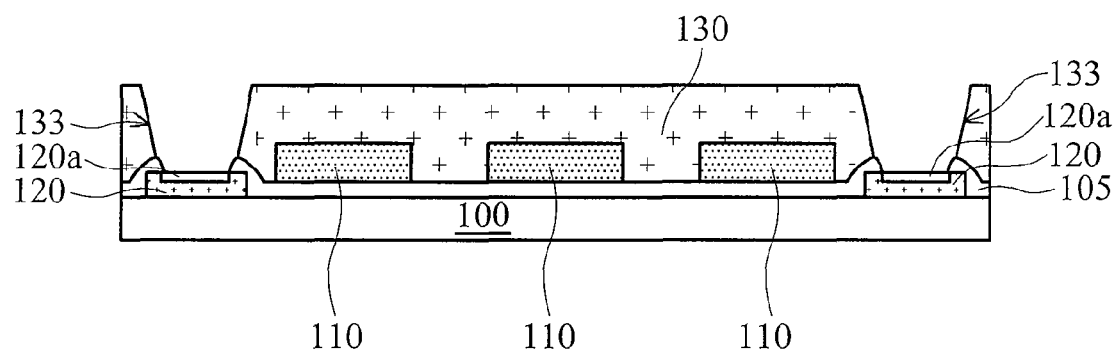

In FIGS. 10C and 11C, the dielectric layer 130 is formed overlying the interconnection line 110 and the ohmic contact interface 120a of the third conductive layer 120. The dielectric layer 130 is then patterned to expose the first terminal 111, the second terminal 112, and further the ohmic contact interface 120a of the third conductive layer 120 as described for FIGS. 8B and 9B. Finally, the second conductive layer is formed overlying the dielectric layer 130, followed by patterning to form the bonding pad 141, the guard ring 142 and the trace line 143 as shown in FIG. 1 as described for the wiring structure 10. The guard ring 142 further electrically connects the third conductive layer 120 as shown in FIGS. 5A through 5C, completing the inventive wiring structure as shown in FIGS. 1 and 5A through 5C.

The efficacy of the inventive systems for displaying images including inventive wiring structures at guarding and sharing the electrostatic charges and plasma charges in the subsequent process, provide improved product yield and process, and compatible process with other devices without additional masks and processing steps.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
   a wiring structure for driving a display panel, comprising:
   a substrate;

a first conductive layer, comprising an interconnection line, overlying the substrate, the interconnection line comprising a first terminal and a second terminal apart from the first terminal;

a dielectric layer overlying the first conductive layer, the dielectric layer comprising a first opening exposing the first terminal, and a second opening exposing the second terminal; and a second conductive layer, comprising a bonding pad, a guard ring surrounding the bonding pad, and a trace line outside the guard ring, overlying the dielectric layer; wherein the bonding pad electrically connects the interconnection line through the first opening; and the trace line electrically connects the interconnection line through the second opening.

2. The system as claimed in claim 1, further comprising a planarization layer overlying the second conductive layer and the dielectric layer, exposing at least parts of the bonding pad.

3. The system as claimed in claim 1, further comprising:

a passivation layer overlying the second conductive layer and the dielectric layer, exposing at least parts of the bonding pad, the guard ring, and the trace line; and a planarization layer overlying the second conductive layer and the passivation layer, exposing at least parts of the bonding pad.

4. The system as claimed in claim 1, wherein the second conductive layer fills the first opening and the second opening.

5. The system as claimed in claim 1, wherein the guard ring is close-looped.

6. The system as claimed in claim 1, wherein the second conductive layer comprises metal.

7. The system as claimed in claim 1, wherein a resistance of the guard ring is less than 10 KΩ.

8. The system as claimed in claim 1, wherein the guard ring is as wide as 50 μm or greater.

9. The system as claimed in claim 1, further comprising an third conductive layer disposed below the guard ring, electrically connecting thereto.

10. The system as claimed in claim 9, wherein the third conductive layer acts as parts of the guard ring, and a resistance of the guard ring is less than 10 KΩ.

11. The system as claimed in claim 9, wherein the third conductive layer acts as parts of the guard ring, and the guard ring is as wide as 50 μm or greater.

12. The system as claimed in claim 9, wherein the third conductive layer is disposed beyond the interconnection line.

13. The system as claimed in claim 9, wherein the third conductive layer is embedded in the dielectric layer.

14. The system as claimed in claim 9, wherein the third conductive layer further comprises an ohmic contact interface on top thereof, contacting the guard ring.

15. The system as claimed in claim 1, further comprising the display panel, wherein the wiring structure forms a portion of the display panel.

16. The system as claimed in claim 1, further comprising an electronic device, wherein the electronic device comprises:

the display panel; and an input unit coupled to the display panel and operative to provide input to the display panel such that the display panel displays images.

17. The system as claimed in claim 16, wherein the electronic device is a mobile phone, digital camera, PDA (personal data assistant), notebook computer, desktop computer, television, car display, or portable DVD player.

18. The system as claimed in claim 2, wherein the display panel is a liquid crystal display (LCD) panel.

19. The system as claimed in claim 3, wherein the display panel is a light-emitting device (LED) display panel.

* * * * *